(12) United States Patent
King (10) Patent No.: US 6,814,095 B2
(45) Date of Patent: Nov. 9, 2004

(54) DOSE SYSTEM

(76) Inventor: Joseph A. King, 142 Chevy Chase Dr., Wayzata, MN (US) 55391

( * ) Notice: Subject to any disclaimer, the term of this patent is extended or adjusted under 35 U.S.C. 154(b) by 191 days.

(21) Appl. No.: 09/923,850

(22) Filed: Aug. 7, 2001

(65) Prior Publication Data

US 2003/0029498 A1 Feb. 13, 2003

(51) Int. Cl.$^7$ ............................................... B01D 11/02
(52) U.S. Cl. .................... 137/1; 137/268; 137/205.5; 422/264; 422/266; 222/325
(58) Field of Search ......................... 137/1, 581, 205.5, 137/268; 222/160, 162, 325; 422/282, 266, 264, 256

(56) References Cited

U.S. PATENT DOCUMENTS

| | | | | |
|---|---|---|---|---|
| 2,326,212 A | * | 8/1943 | Garelick | 137/205.5 |
| 3,194,444 A | * | 7/1965 | Hubert | 137/205.5 |
| 4,662,387 A | | 5/1987 | King, Sr. | 137/268 |
| 4,842,729 A | | 6/1989 | Buchan | 210/198.1 |
| 5,218,983 A | | 6/1993 | King | 137/1 |
| 5,498,333 A | | 3/1996 | Canther | 210/198.1 |

FOREIGN PATENT DOCUMENTS

| | | |
|---|---|---|
| AU | 81144 82 | 9/1982 |
| DE | 29 41 966 | 4/1981 |
| WO | WO 01/51420 | 7/2001 |

* cited by examiner

Primary Examiner—Kevin Lee
(74) Attorney, Agent, or Firm—Jacobson & Johnson (57) ABSTRACT

An apparatus and method for delivering both quick dispensing water treatment materials and slow dispensing water treatment materials from the same dispensing unit by dispensing the slow dispensing water treatment materials over an extended period of time and the quick dispensing water treatment materials in a matter of minutes to allow the container for the quick dispensing water treatment materials to be removed and replaced with either a container containing a different quick dispensing water treatment materials or a container containing a slow dispensing water treatment material and a closed container for holding a quick dispensing water treatment materials therein and for dispensing the quick dispensing water treatment material therefrom through a process of cross circulation between a fluid stream of waster and the quick dispensing water treatment material in the container.

15 Claims, 6 Drawing Sheets

DOSE SYSTEM

FIELD OF THE INVENTION

This invention relates generally to dispensing systems and, more specifically, to a dispensing system for a "dose" type water treatment material and a method for effectively dispensing two different types of water treatment materials one of which is a "dose" type water treatment material.

CROSS REFERENCE TO RELATED APPLICATIONS

None.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of delivery of two or more water treatment materials from a single dispersal unit is known in the art as evidenced by Sexton U.S. Pat. No. 5,251,656 and King U.S. Pat. Nos. 6,210,566 and 6,190,547. In general, in these type of systems unless the system is shut off the water treatment materials are continually dispensed into the body of water.

In order to appreciate the present invention one needs to recognize two types of water treatment materials which are herein referred to as "quick dispensing water treatment materials" and "slow dispensing water treatment materials".

The term "quick dispensing water treatment materials" as used herein refers to water treatment materials that are generally liquid and can effectively be dispensed into a pool spa or other body of water in a matter of a few seconds. These type of materials are also generally referred to as "single dose" materials since they can be emptied into a body of water at once and provide water treatment for a period of days or weeks. Typical examples of such materials are algaecides, oxidizers, conditioners and clarifiers. In general with the quick dispensing water treatment materials it is not necessary to continually deliver the water treatment materials to the body of water since a single application or dose will last for weeks or months. However, for the quick dispensing water treatment materials to be effective the quick dispensing water treatment materials need to be dispersed or diffused throughout the body of water. Sometimes the quick dispensing water treatment materials, which do not need to be dispensed over an extended period of time, are in fact dispensed over and extended period of time in the same manner as the slow dispensing water treatment materials. This effectively limits the amount of water treatment materials that can be supplied to a body of water from a single dispensing unit as well as increases the amount of time for the body of water to achieve effective levels of the quick dispensing water treatment materials since the quick dispensing materials are dispensed at slow rates.

In contrast to the manual delivery system for quick dispensing water treatment materials there are delivery systems for slow dispensing water treatment materials. Examples of delivery systems for slow dispensing water treatment materials are shown in my U.S. Pat. No. 6,210,566 titled Nestable Containers and Improved Water Treatment Materials and U.S. Pat. No. 6,190,547 titled Water Treatment System and is hereby incorporated herein by reference. These systems can provide for simultaneously deliver of two slow dispensing water treatment materials.

Although the quick dispensing water treatment materials do not need to be continually dispensed it is important to ensure that the quick dispensing water treatment materials are sufficiently dispersed throughout the body of water. Typically, the diffusion rate for quick dispensing water treatment materials is not sufficiently high so that the quick dispensing water treatment materials can quickly diffuse throughout a large body of water, such as a pool. As a result, even after many days have elapsed there still may be regions or pockets in the pool where the quick dispensing water treatment materials are not at effective concentrations because of insufficient diffusion of the quick dispensing water treatment materials throughout the body of water.

In order to address the problem of inadequate diffusion, the quick dispensing water treatment materials generally require some intermediate dispensing action to obtain a rapid and effective concentration of quick dispensing water treatment materials throughout the body of water. One prior art procedure used by pool owners is to mix the quick dispensing water treatment materials in a bucket of water. The water in the bucket which typically can contain on the order of one to 5 gallons of water, and the quick dispensing water treatment materials are stirred together to disperse the quick dispensing water treatment materials throughout the water in the bucket. The bucket, with the mixture, is then emptied around the sides of the pool to allow the quick dispensing water treatment materials to diffuse from multiple sites around the pool.

Another method of dispensing a liquid algaecide is shown in Sexton U.S. Pat. No. 5,251,656. Sexton uses two separate containers one for solid chlorine tablets and the other for a liquid algaecide. The liquid algaecide is held in a plastic bag within an outer container. The liquid algaecide is prevented from flowing out of the plastic bag by a porous filter located on the plastic bag. The top of Sexton's outer container contains openings to allow air to enter the outer container. By increasing the pressure on the inside of the container the liquid algaecide is squeezed out of the plastic bag and allowed to enter the stream of water flowing though his valve. Once the bag containing the liquid algaecide is empty it is replaced with a new filled container. Thus while Sexton continually and simultaneously delivers both a normally quick dispensing water treatment material and a slow dispensing water treatment material he does not deliver material in dose form for materials that only need to be applied on a weekly or monthly basis.

In contrast, the present invention permits a quick dispensing water treatment material to be dispensed into the body of water usually in a matter of minutes or hours while the slow dispensing water treatment material is dispensed over an extended period of time of weeks. Once the pool is "dosed" the container for the quick dispensing water treatment material can be removed from the dispensing unit and replaced with a different type of quick dispensing water treatment material, for example a clarifier which can also be dispensed in a matter of minutes. Consequently, a single dispersal member can be used to dispense two or more different water treatment materials with both "doses" of quick dispensing water treatment material being first dispensed into the body of water by the stream of water and secondly the quick dispensing water treatment material once dispersed allowed to quickly diffuse throughout the body of water.

A feature of the present invention is that it eliminates the consumer having to measure ingredients every week and then manually dose the swimming pool.

A further feather of the present invention is that there is a more thorough and rapid dispersal of the water treatment material throughout the pool by the use of the fluid stream to carry the water treatment material. This in turn allows for more rapid diffusion of the water treatment materials throughout the body of water, consequently the body of water more quickly obtains the proper treated condition with the present invention.

SUMMARY OF THE INVENTION

Briefly, the invention comprise an apparatus and method for delivering either or both quick dispensing water treatment materials and slow dispensing water treatment materials from the same dispensing unit by dispensing the slow dispensing water treatment materials over an extended period of time and the quick dispensing water treatment materials in a matter of minutes and if desired, to allow the container for the quick dispensing water treatment materials to be removed and replaced with either a container containing a different quick dispensing water treatment materials or a container containing a slow dispensing water treatment material.

Figure 1:
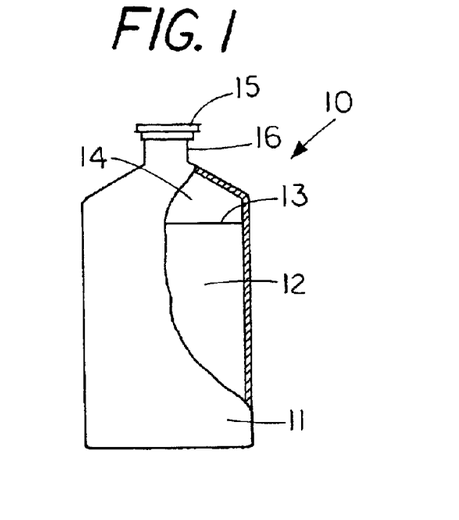
FIG. 1 is a partial sectional view of a container holding a quick dispensing water treatment material.

FIG. 9 is a front view of a container identical to the container shown in FIG. 8 except the container has a single port rather than separate inlets and outlets.

DESCRIPTION OF THE PREFERRED EMBODIMENTS

FIG. 1 shows a partial cut-away side view of a container for use in the present invention. FIG. 1 shows container 10 in the normal position during transit and storage. Container 10 comprises a housing 11 having a neck 16 with a removable closure 15, such as a screw cap extending across spout or neck 16 to maintain the liquid 12 within the interior cavity 14 of container 10. The container 10 is shown in an upright condition with the liquid level indicated by reference numeral 13. The contents of container 11 comprise a quick dispensing water treatment material. The container 10 is suitable for insertion into either a dispersal valve or a dispersal unit wherein a stream of water flows therethrough.

In the embodiment shown housing 11 forms a fixed or rigid three dimensional cavity 14 therein that remains in an uncollapsed condition as liquid 12 circulates out of container 11.

In one embodiment of the present invention the quick dispensing water treatment materials is located in the closed cavity 14 during transit and storage and is released by an indirect process referred to as "fluid entrainment". That is, fluid entrainment, can be considered an indirect fluid transfer process whereas flow directly into a container through a separate inlet and the subsequent flow through a separate fluid outlet in the container can be considered a direct fluid transfer. Briefly, fluid entrainment occurs when one fluid flows laterally past another fluid at rest. The pressure of the fluid moving past the stationary fluid is less than the pressure of the fluid at rest causing fluid from the container 10 flow into the fluid stream until a state of equilibrium is reached. When the state of equilibrium is reached between the fluid in the container and the moving stream a secondary circulation of fluid occurs as the fluid in the container is gradually entrained or pulled into the fluid stream while fresh fluid in the stream slowly flows into the container to replace the fluid entrained into the fluid stream.

The gradual removable of fluid from within the closed container through a process of entrainment, which causes another portion of the fluid stream to enter the container, dilutes the contents of the container. This results in the gradual dilution of the contents of the container as the quick dispensing water treatment material is dispensed throughout the system. In contrast, in the one shot process a water treatment material is dumped into a body of water such as a pool or spa and is allowed to diffuse from the spot where the material was dumped into the pool. The process of entrainment with the container shown in FIG. 1 is a gradual removal of the contents of the container by allowing fluid to be entrained or dribbled out of the container by use of a single opening on the container that allows the user to disperse the liquid contents of a container into a fluid stream over a period of time ranging from a few minutes to a few hours. The result is that the water treatment material in the container can be mixed with a substantial amount of water of the system. In contrast, in the container flow through process, which allows water to flow directly through the container, one quickly displaces the liquid in the container and thus limits the opportunity of mixing the liquid in the container with a substantial amount of water in the system.

FIG. 2 shows container 10 with closure 15 removed. Container 10 has been placed upside down in a dispersal unit 20 with the single opening 16*a* of the container located as the lower most point of the container. Dispersal unit 20 has an inlet 23 and an outlet 24 and a container support 25 that extends radially inward to hold the container in a suspended position shown in FIG. 2. As the dispersal unit is located in a line of a pool system the water level might normally rise to a level in the dispersal valve as indicated by reference numeral 28. Consequently, if container 10 is inverted with the spout 16 located below the water line the contents 12 of the container will not flow out of container 10. That is, the air pressure Po in the top of the container prevents the liquid 12 from flowing out of the container. Consequently, with the system off but with water in the dispersal unit one can invert the container and still maintain the liquid in container 10. In essence the liquid 12 in the container 10 is held within the container 11 by a vacuum formed in chamber 14. The liquid will flow out of the container 10 if air can enter under spout 16 of if liquid flows in to replace liquid that flows out. As long as air cannot enter container 10 the amount of liquid 12 that remains in container 10 is constant but the liquid therein can be gradually diluted by cross circulation of fluid between the fluid stream and the liquid in the container.

In order to prevent the water or liquid 12 from escaping during transit or storage a cover 22 can be removably attached to container spout 16 by the use of threads or the like. One can control the rate of dispensing of material from container 10 by controlling the size of the spout in relation to the size of the container. That is, the larger the cross sectional area of the spout in relationship to the diameter of the container the more quickly liquid can be entrained or dispensed and conversely the smaller the diameter of the spout in relation to the diameter of the container the slower the liquid in the container will be dispensed or entrained therefrom.

In the embodiment shown in FIG. 2 the container for dispensing materials into a stream of water includes: a quick dispensing water treatment liquid 12 located in container 10 with the container 10 having a single opening 16a so that when the container is placed upside down with spout 16 below the water line 28 a vacuum within chamber 14 retains the quick dispensing liquid 12 in the container 10 until a stream of water flowing laterally past the container spout 16 can entrain and carry the quick dispensing water treatment liquid 12 to other parts of the system.

Figure 2:
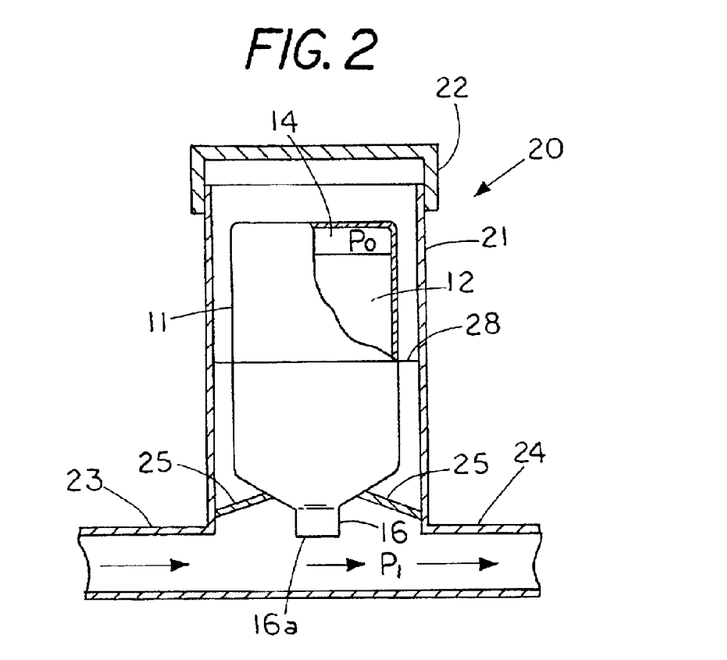
FIG. 2 is sectional view shown the container of FIG. 1 in a dispensing condition in a dispersal unit.

FIG. 2 illustrates the quick dispensing water treatment material 12 is held in a container 10 within dispersal unit without the quick dispensing water treatment material being dispersed. In order to bring about "on demand" dispersal of liquid quick dispensing water treatment material a stream of water is directed through inlet 23 so as to laterally flow past the open end of spout 16. The action of water flowing laterally past spout 16 creates a cross circulation between the water flowing laterally past the spout 16 and the liquid 12 in container 10 (indicated by arrows). As a result the cross circulation set up between the stream of water and the liquid in the container 10 one gradually dilutes the concentration of liquid in container 10 while the concentration of water treatment material in the system outside the container increases. In most applications the contents of a container which may' be on the order of a gallon of liquid can be dispensed into the system in an hour or less which provides sufficient time for effective mixing and dispersing of the liquid into the body of water. Once the water treatment material is dispensed into the fluid stream, the fluid stream caries the water treatment material around the pool where the circulation forces produced by the stream of water further disperses the liquid water treatment material around the pool. Once dispersed around the pool the water treatment material can quickly diffuse to even remote regions of the pool.

Figure 3:
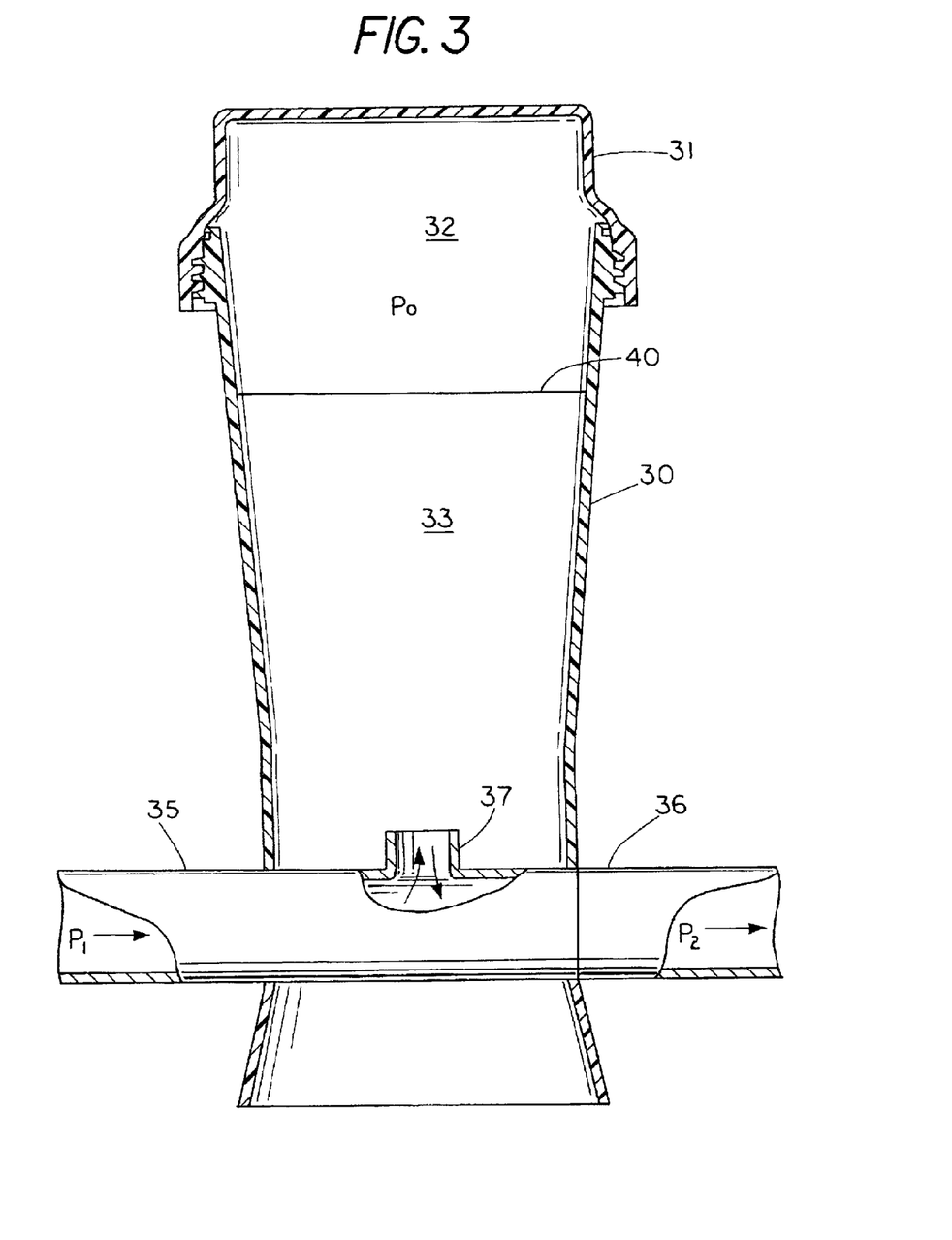
FIG. 3 is an alternate embodiment of the invention wherein the dispersal unit is used as the container.

FIG. 3 illustrates another embodiment of the invention wherein a dispersal unit 30 includes a cover 31. In the embodiment shown the contents of container 10 have been poured into the chamber 32 in unit 30. The level of water treatment material or water line is indicated by reference numeral 40. Located at the bottom of dispersal unit 30 is an inlet 31 and an outlet 36 with a single port 37 extending laterally upward into the liquid water treatment material 33 in housing 40. As the water seeks its level the liquid in this case the quick dispensing water treatment material that is poured into chamber 32 remains substantially within container 30 in an "on demand" condition. Once water is directed through the dispersal valve inlet 35 it creates a cross circulation between the liquid 33 in container 30 and the stream of water flowing past the inlet. In this embodiment the quick dispensing water treatment material 33 can be poured directly into the dispersal unit 30 and held in a ready to disperse condition without the need of a separate container in the chamber.

In the system shown in FIG. 3 one can provide a water treatment with a dispersal unit 30 having a compartment 32 for containing a quick dispensing water treatment material 33 of a first concentration. Located along the bottom of the dispersal unit is a conduit 39 for directing a stream of water along a first axis extending through the conduit and a portion of the dispersal unit 30. The conduit 30 is shown having a lateral opening 37a to chamber 33 so that when a stream of water 40 flows through the conduit 39 it generates a lateral cross circulation between the quick dispensing water treatment material 33 and the stream of water 40 which gradually dilutes the concentration of water treatment material 33 in the compartment 32 while increasing the concentration of quick dispensing water treatment material outside the compartment 32.

Figures 4, 5:
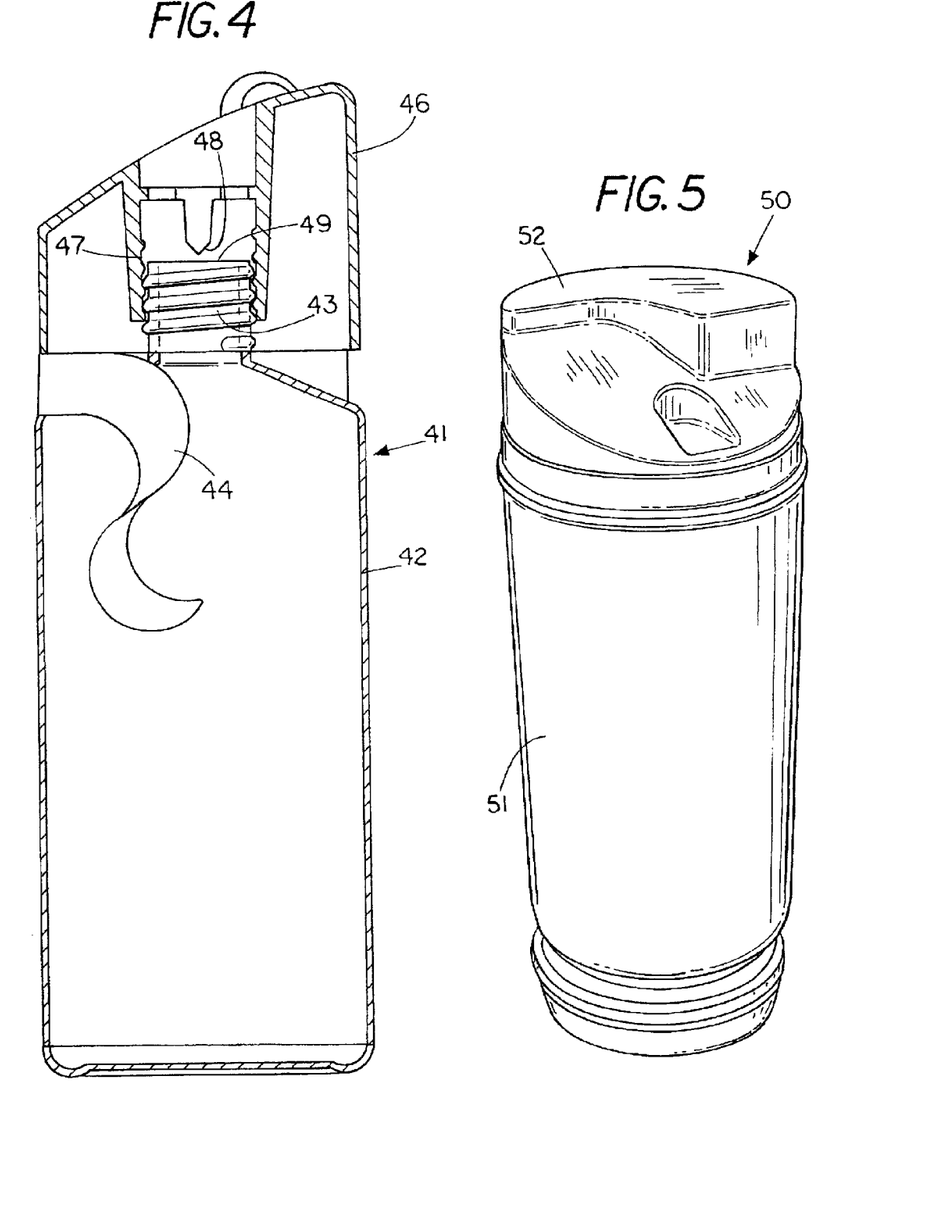
FIG. 4 is a cross sectional view of a container with a seal that is penetrable by rotation a housing on the container.
FIG. 5 is pictorial view of a container for insertion into a dispersal valve.

FIG. 4 shows a partial sectional view of an alternate embodiment 41 which includes punctureable cap or seal 49 that is fastened to a container 42. Located on top of container 42 is a cover 46 that includes a female thread 47 and a projection 48 for piercing the punctureable seal 48. The container 42 can contain a quick dispensing water treatment material. Located around the container 42 and secured to cover 46 is a peelable strip 44 that maintains the cover 46 with the container 42 in the condition shown. In order to open the container the strip 44 is removed allowing for rotation of cover 23 which causes member 48 to pierce the seal. Thus the container 42 can be ruptured by turning a cover to place the container 42 in a position for dispensing of liquid. In a preferred embodiment the seal remains on the container until the container seal is broken by insertion of the container onto a key or support in the dispersal unit. This feature eliminates the consumer having to come into direct contact with any of the materials held in the container.

FIG. 5 shows a further embodiment of the invention comprising a container 51 that is normally used in the nestable containers. The top portion of container 51 is covered by a seal 52 that is punctureable in only one location to provide a single inlet to the container. Once positioned in the dispersal valve the liquid therein can be dispensed into the stream of fluid flowing therethrough.

Figure 6:
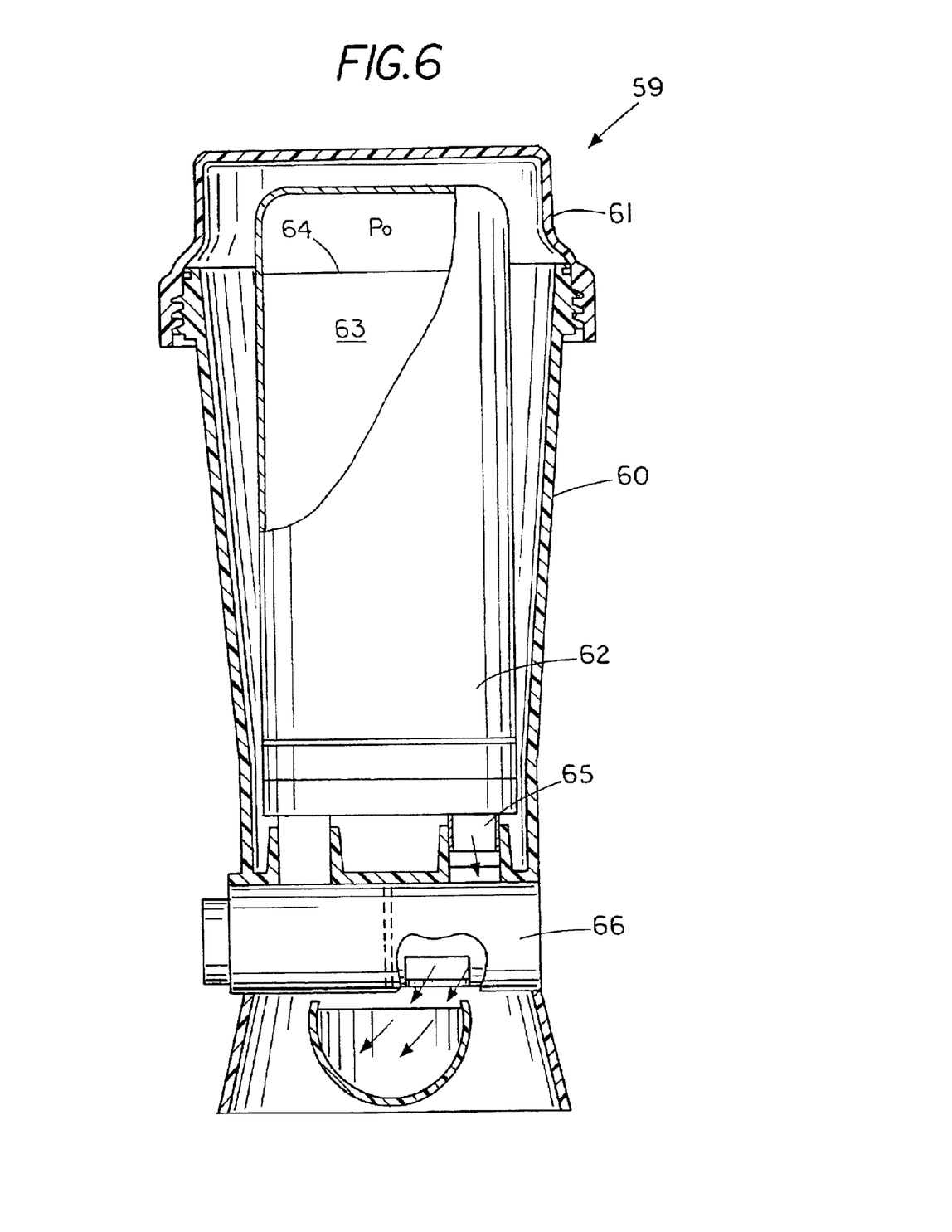
FIG. 6 is a cross sectional view of a dispersal valve holding a liquid dispensing container therein.

FIG. 6 shows a cross sectional view of a dispersal valve 59 having a cover 61 on a housing 60. Located on the bottom of housing 60 is a rotary valve 66 for directing water past the end of a single opening 65 on the bottom of container 62. The container 62 is cutaway to reveal the liquid 63 extending upward to a level indicated by reference numeral 64. As long as the water level in housing 62 is above the spout 65 the liquid 63 remains in container 62. Once water is directed through conduit 66 it sets up a cross circulation between the liquid in container 62 and conduit 66.

Figure 7:
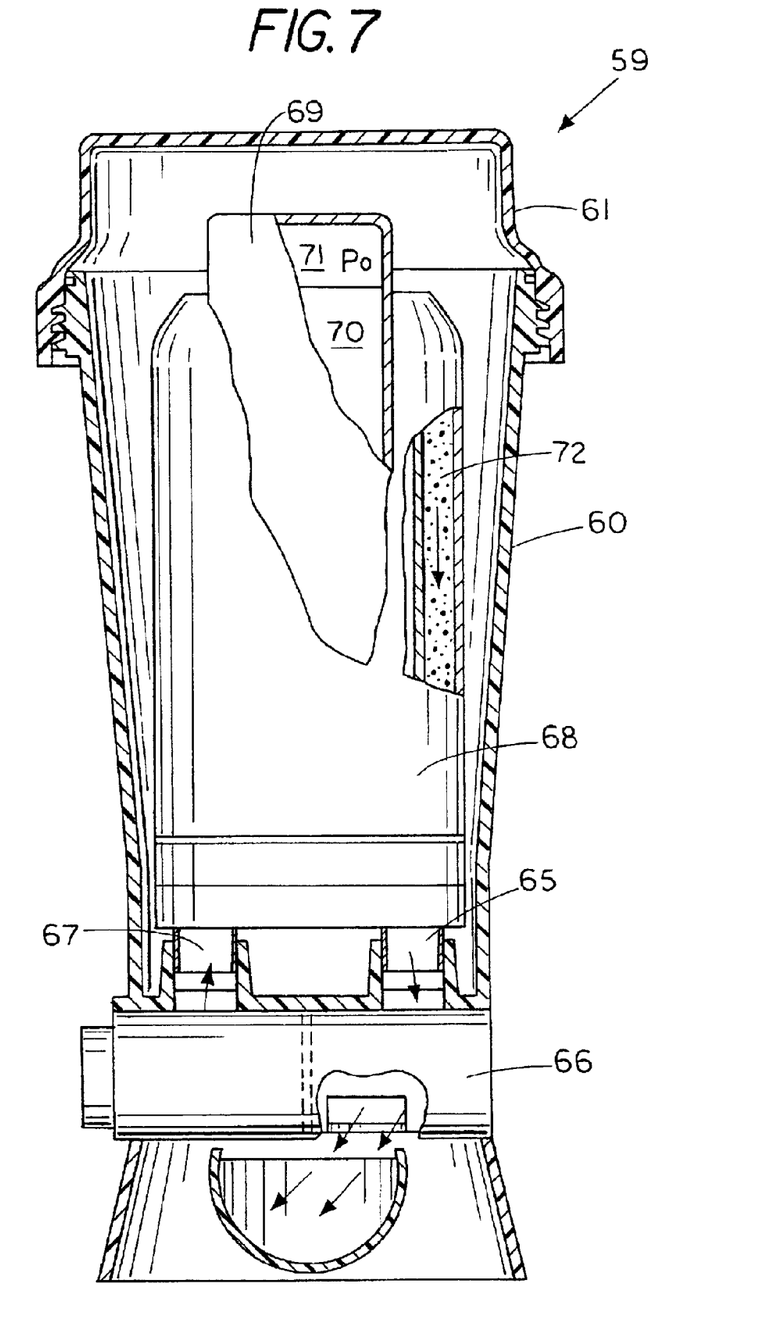
FIG. 7 is a cross sectional view of a dispersal valve having nestable container with the inner nestable container replaced with a container for holding quick dispensing water treatment materials

FIG. 7 shows dispersal valve 59 with a cover 61 extending over two nesting canisters or containers 69 and 68. Outer container 68 comprises a container for holding slow dispensing water treatment materials and includes an inlet 67 and an outlet 65 that permit flow of water through the material 72 in the outer annular canister 68. Nested within container 68 is cylindrical container 69 which contains a liquid 70 that is maintained in container 68 by the pressure Po within the upper portion 71 of container 68 as viewed in FIG. 7. It should be pointed out that while the outer container contains both an inlet and an outlet for directing water therethrough the container 68 contains only a single inlet so that the water being exchanged between the container and the stream of water occurs by cross circulation rather than direct circulation.

The embodiment of FIG. 7 can form part of a kit for water treatment with the kit including a first container 68 for holding a slow dispensing water treatment material that is to be dispensed over a period of weeks. A second container for holding a slow dispensing water treatment material that is to be dispensed over a period of weeks (not shown). The second container is identical to a third container except the second container includes both an inlet and an outlet to permit water to be directed therethrough and the third container contains only a single spout or port. The third container 69 holds a quick dispensing water treatment material that is to be dispensed over a period of minutes.

When multiple container are used in conjunction with a dispersal valve 60 that simultaneously holds two containers and one of the containers has a configuration that allows for temporary replacement of one of the container one can dose or apply quick dispensing water treatment materials with a system that is intended for use with slow dispensing water treatment materials. That is once quick dispensing water treatment materials is dispersed, which is usually a matter of minutes, the container can be removed and replaced with a container holding the slow dispensing water treatment materials to allow one to simultaneously dispensed two the slow dispensing water treatment materials. Thus the consumer can perform an additional water treatment operations with the present invention.

Figure 8:
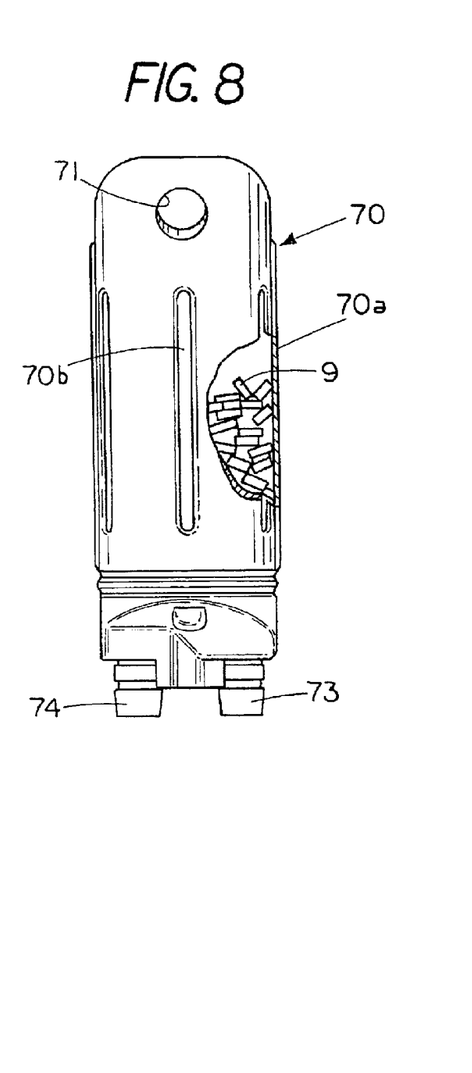
FIG. 8 is a front view of a container with an inlet and an outlet for delivering a slow dispensing water treatment material such as chlorine; and

FIG. 8 is a partial cutaway view front view of one embodiment of a nestable canister for nesting within the canister of FIG. 7 and for holding dissolvable or erodeable solids such as chlorine tablets or sticks. That is, the slow dispensing water treatment materials. Nestable canister 70 comprises a cylindrical outer wall 70a with reinforcing groves 70b to provide stiffness to internally nestable canister 70. A first finger grip 71 enable the nestable canister 70 to be lifted from or lowered into the nestable canister 68 shown in FIG. 7. Nestable canister is preferably made from a polymer plastic or the like.

Nestable canister 70 includes an inlet port 73 for engaging a portion of the inlet flow from a dispersal valve and a fluid outlet port 74 for directing the portion of the fluid back into the main liquid stream. The cutaway view shows solid dispersing tablets 9 located within nestable canister 70. Tablets 9 can typically be chlorine tablets for killing bacteria. The operation of nestable canister 70 is such that a fluid stream flows through an inlet 73 and out through an outlet 74. Thus a fluid circulation path is established from one side of container 70 to the other side of container 70.

Figure 9:
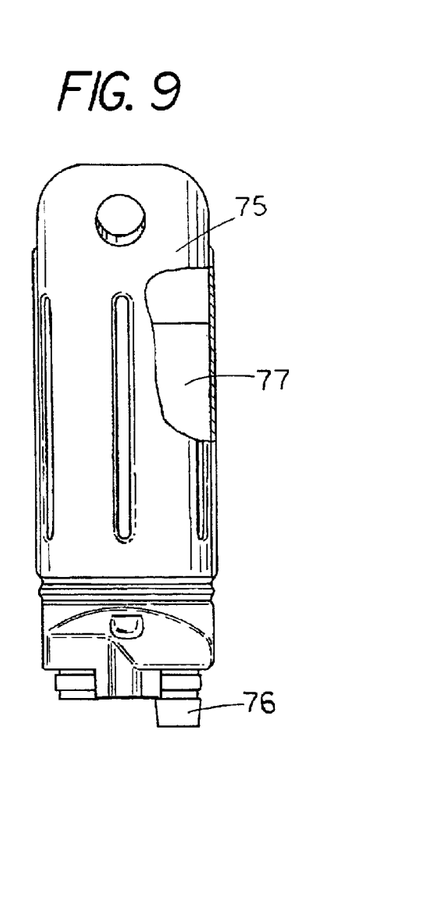

FIG. 9 show a partial sectional view of a second nestable canister 75. Nestable canister 75 is identical to container 70 except that canister 75 has a single port 76 for the ingress and egress of fluid from container 75. Thus in the canister 75 a fluid stream does not have an distinct inlet and outlet ports for the fluid stream to enter and leave canister 75, which prevents direct flow though canister 75. Located within nestable canister 75 is a liquid 77 which may be an algaecide or the like. The liquid located in canister 75 is a quick dispensing water treatment material as previously described while the material 9 located in canister 70 is a slow dispensing water treatment material.

Thus the quick dispensing water treatment material 77 is contained in a canister that has only a single port while with the slow dispensing water treatment material 9 is contained in a canister that has two ports. Note, that both canisters are identical in size and shape which allows the interchangeably between canister of FIG. 8 and FIG. 9. That is, if canister 70 with two ports 73 and 74 can be nested in dispersal valve 59 a canister with only a single port 76 can likewise be nested in dispersal valve 59. This interchangeably of the nesting canister provides for enhanced water treatment capacity since either canister can be used.

Thus a feature of the invention is a new method of treatment of water comprising the steps of: 1. placing a container 68 having a slow water treatment material for dissipation over an extended period of time into a dispersal unit; and 2 placing a container 69 with a quick dispensing water treatment material into the dispersal valve and allowing a stream of water to flow past the container with the stream of water entraining the quick dispensing material to allow the quick dispensing materiel to be dispersed throughout system. One can then remove container 69 and place container 70 with a slow dispensing water treatment materials therein.

Referring to FIG. 1 the present invention also includes a new method of water treatment with a quick dispensing material that might not include the step of conjunctive use with a slow dispensing water treatment materials. This process comprises 1.placing the quick dispensing water treatment materials in a container 10; placing the container 10 in a dispersal unit 20; and opening the container 10 after the container is in the dispersal unit to allow for fluid communication between a stream of water flowing through the dispersal unit so that the quick dispensing water treatment materials can be gradually dispensed into the stream of water through a process of fluid entrainment to thereby dispense the contents of the container into a body of water over a relatively short period of time.

It will be understood that one can vary the rate of entrainment by varying the velocity of the fluid stream flowing past the spout of the container as well as the size of the container spout. While the invention has been described in relation to a body of water such as a pool it is envisioned that the method and apparatus can be used in other systems that require only dosing as well as those systems that require both dosing and long term dispersion of materials. While the system has been shown in relation to a dispersal unit or dispersal valve that could be temporary or permanently mounted to the system the present invention is also useable in various other portions of a water treatment system. For example, if the system is a pool system the present invention could be located in the skimmer or in the pool or other portions of the system.

What is claimed is:

1. A container for insertion into a dispersal valve having a stream of water flowing therethrough with said container comprising:

a housing, said housing forming a three dimensional cavity therein; and a quick dispensing water treatment material located in the cavity formed by said housing, said cavity normally closed for holding the quick dispensing water treatment material therein during transit and storage of the quick dispensing water treatment material, said housing having an opening therein; and an inlet, said inlet directing the stream of water flows laterally pest the opening in the housing to entrain the quick dispensing water treatment material therein to allow the quick dispensing water treatment material to be carried throughout a water system by the stream of water.

2. The container of claim 1 wherein the quick dispensing water treatment material is a liquid.

3. The container of claim 1 wherein the quick dispensing water treatment material in the container remains confined in the container until the container is proximate a support for the container.

4. The container of claim 1 wherein the container housing has a rigid self supporting side wall to avoid collapse under pressure within a dispersant system.

5. The method of water treatment with a quick dispensing water treatment material comprising:
  placing a quick dispensing water treatment material in a container having a spout;
  placing the container in a dispersal unit; and
  opening the container to allow water to flow laterally past the spout to entrain and dispense the quick dispensing water treatment material into a stream of water flowing through the dispersal unit.

6. The method of claim 5 including the step of placing the container in the dispersal valve with the spout for dispensing the quick dispensing water treatment material located on the bottom of the container.

7. The method of claim 5 wherein the water flowing though the dispersal valve removes the quick dispensing water treatment material solely through the process of entraining material from the container as the water flows laterally past the spout of the container.

8. A system for water treatment comprising:
  a dispersal valve;
  a compartment in said dispersal valve;
  a stream of water flowing through said dispersal valve;
  a container for holding a quick dispensing water treatment material, said container having a spout positionable in said dispersal valve;
  and an inlet directing water laterally of said spout to permit the quick dispensing water treatment material to be indirectly metered into the stream of water flowing through said dispersal valve with said container removable from said dispenser for replacement with a container for holding a slow release material to be dispensed into a fluid stream.

9. A container for dispensing water treatment materials into a stream of water including:
  a quick dispensing water treatment material comprising a liquid located in said container;
  a spout having an opening in a one end of a container with the container having a closed other end so that when the container is placed with the spout in a body of water a vacuum within the container retains the liquid in the container; and
  an inlet directing a stream of water laterally past the opening in the spout so the stream of water can entrain and disperse the quick dispensing water treatment liquid therefrom to thereby decrease a concentration of the liquid in the container while increasing a concentration of liquid in the rest of the system.

10. The container of claim 9 wherein the container has a single spout and the cross sectional area of the spout is less than the cross sectional area of the container.

11. The container of claim 9 wherein the quick dispensing water treatment material comprises an algaecide.

12. The container of claim 9 wherein the quick dispensing water treatment material comprises a clarifier.

13. A system for water treatment comprising:
  a dispersal unit;
  a compartment in said dispersal unit;
  a quick dispensing water treatment material of a first concentration located in the compartment of said dispersal unit,
  a conduit for directing a stream of water along a first axis extending through a portion of said dispersal unit, said conduit having a lateral opening to the chamber so that when a stream of water flows through said conduit it produces a lateral cross circulation between the quick dispensing water treatment material and the stream of water to gradually dilute the first concentration of water treatment material in the compartment while increasing a second concentration of quick dispensing water treatment material in the system outside the compartment.

14. The system of claim 13 wherein the quick dispensing water treatment material is a liquid.

15. The system of claim 14 wherein the quick dispensing water treatment material is an algaecide.

* * * * *